UNITED STATES PATENT OFFICE.

BRUCE FORD, OF PHILADELPHIA, PENNSYLVANIA.

ELECTRIC STORAGE BATTERY.

997,984.

Specification of Letters Patent.   Patented July 18, 1911.

No Drawing.   Application filed December 13, 1907.   Serial No. 406,252.

*To all whom it may concern:*

Be it known that I, BRUCE FORD, a citizen of the United States, residing at the city of Philadelphia, in the county of Philadelphia and State of Pennsylvania, have invented certain new and useful Improvements in Electric Storage Batteries, of which the following is a specification.

Negative pole plates of the Planté as well as of the Faure or Brush type are improved as to capacity and otherwise when they have incorporated throughout their active material or material to become active inert material in an extremely fine state of sub-division.

It is the principal object of the present invention to provide for introducing such finely divided inert material throughout the mass of active material or material to become active of the negative pole plates including those of the types mentioned.

My invention is based upon the fact that deflocculated graphite made by mixing up finely divided graphite with water containing tannin constitutes a substance which penetrates the pores, openings or interstices of the active material or material to become active and upon the further fact that by neutralizing the effect of the tannin the finely divided graphite is deposited. Lamp black, clay and other non-crystalline substances may be deflocculated and act in the same way.

To practice the invention, deflocculated graphite or other material of the kind referred to is made by mixing up finely divided graphite or other material with water containing tannin or the like with or without a small quantity of alkali as ammonia, and this deflocculated graphite or other material is permitted to penetrate the pores, openings or interstices of the active material or material to become active of a negative pole plate of any of the types mentioned. One way of doing this is to dip the plates into the solution of deflocculated graphite or other material and to permit them to remain so that the deflocculated graphite or other material may penetrate their active material or material to become active which it will do since it will pass through filters. Another way is to mix the deflocculated graphite or other material with the active material or material to become active of plates of the Brush type. Thereafter the effect of the tannin or like material used with the deflocculated graphite or other material is neutralized so that the finely divided graphite or other like material of the kind referred to becomes flocculent and is precipitated. This can be accomplished by immersing the plates in an acid solution as the electrolyte or by drying. By this method finely divided inert material may be incorporated throughout the active material or material to become active when the plates are finished or during their manufacture or even to rejuvenate them after they have been subjected to use.

What I claim is:

1. The method of incorporating inert material into the active material or material to become active of negative pole plates which consists in treating deflocculatable inert material with a deflocculizing substance, permitting the deflocculated inert material to penetrate the pores, interstices or openings of the active material or material to become active, and then neutralizing the deflocculizing substance to precipitate the inert material throughout the mass of the active material or material to become active, substantially as described.

2. The process of incorporating finely divided inert material with the active material or material to become active of the negative pole plates of electric storage batteries which consists in effecting the addition of the inert material by precipitation from a deflocculated condition.

3. The method of incorporating finely divided inert material with the active material or material to become active of negative pole plates which consists in preparing deflocculated inert material by mixing the finely divided inert material with water containing tannin, applying the deflocculated inert material to the plates and permitting it to penetrate the pores, openings or interstices of the active material or material to become active, and neutralizing the tannin to destroy the effect thereof, substantially as described.

4. The method of incorporating finely divided graphite into the active material or material to become active of negative pole plates which consists in impregnating the active material or material to become active with deflocculated graphite, and precipitating the finely divided graphite throughout the mass of the active material or material to become active, substantially as described.

5. The method of incorporating finely divided insoluble inert material into the active material or material to become active of the negative pole plates of electric storage batteries which consists in immersing the active material in a liquid holding the inert material in suspension, and precipitating said inert material throughout the mass of active material.

In testimony whereof I have hereunto signed my name.

BRUCE FORD.

Witnesses:
GEO. M. HOWARD,
LEONARD H. WORM.

Copies of this patent may be obtained for five cents each, by addressing the "Commissioner of Patents, Washington, D. C."